No. 798,835. PATENTED SEPT. 5, 1905.
O. D. SHANK.
TOE WEIGHT.
APPLICATION FILED JULY 5, 1904.
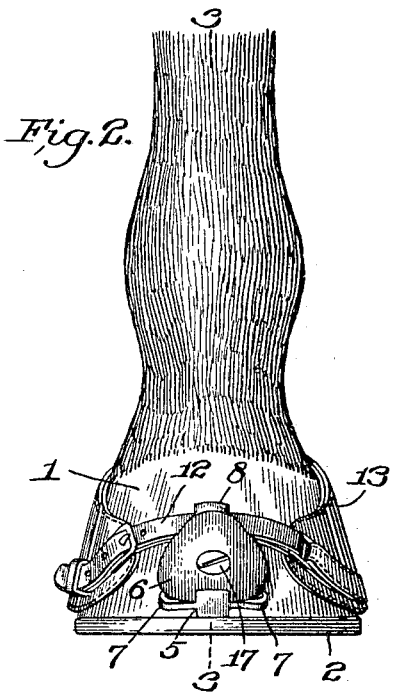
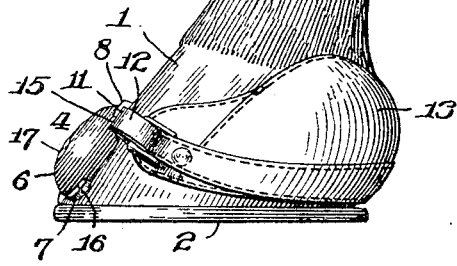
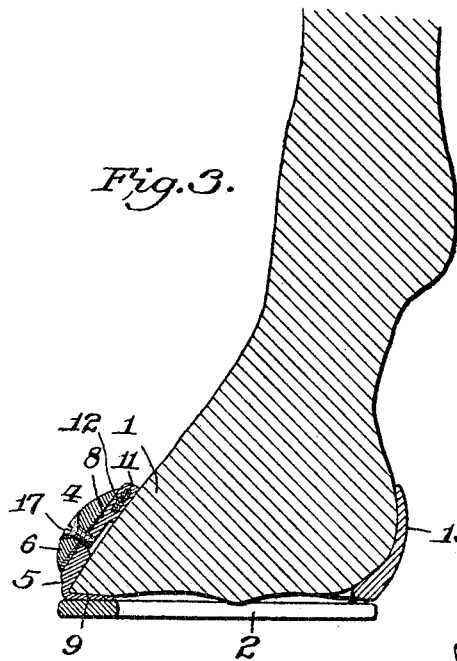
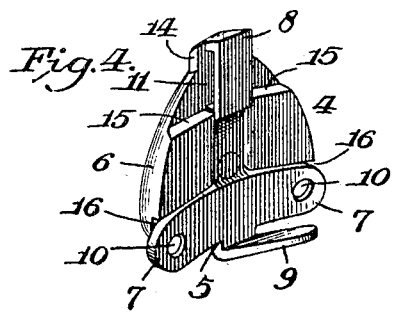
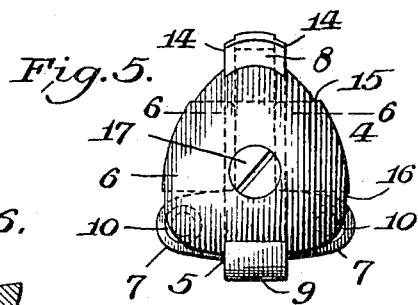
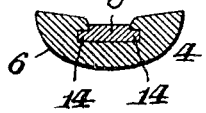
WITNESSES:
INVENTOR
Orey D. Shank
BY
A. V. Grout
ATTORNEY.

UNITED STATES PATENT OFFICE.

OREY D. SHANK, OF PHILADELPHIA, PENNSYLVANIA.

TOE-WEIGHT.

No. 798,835. Specification of Letters Patent. Patented Sept. 5, 1905.

Application filed July 5, 1904. Serial No. 215,249.

*To all whom it may concern:*

Be it known that I, OREY D. SHANK, a citizen of the United States, residing at Philadelphia, in the county of Philadelphia and State of Pennsylvania, have invented certain new and useful Improvements in Toe-Weights, of which the following is a specification.

This invention relates to toe-weights for horses, and has for its object to provide a simple and efficient construction and organization of parts whereby the weight carried by the horse's hoof may be readily increased or decreased, as desired, and whereby any liability of the device becoming accidentally detached from the hoof is rendered less liable than heretofore.

With this object in view the invention consists in the novel construction and combinations of parts which will be hereinafter fully described and claimed.

In the drawings, Figure 1 is a side elevation of my improved toe-weight as applied to a horse's hoof. Fig. 2 is a front elevation thereof. Fig. 3 is a vertical section, as on the line 3 3 of Fig. 2. Fig. 4 is a perspective view of the toe-weight as seen from the rear. Fig. 5 is a front elevation thereof. Fig. 6 is a sectional detail, as on the line 6 6 of Fig. 5.

1 designates a horse's hoof, 2 the shoe thereon, and 4 my improved toe-weight. The toe-weight comprises a bracket or body portion 5, secured to the hoof 1, and a member 6, detachably secured to the bracket 5. The bracket or body portion 6 comprises a pair of horizontal arms 7 7, a vertical arm 8, rising centrally from the arms 7 7, and a flat centrally-arranged projection 9, extending rearwardly from a point directly below the arms 7 7.

In applying the bracket 6 to the hoof of a horse the projection 9 is passed between the bottom of the hoof 1 and the top of the shoe 2 until the arms 7 7 and 8 rest against the hoof, the hoof being slightly cut away to receive the projection 9. The bracket 6 is then secured to the hoof by suitable screws passing through openings 10 in the outer ends of the arms 7 7 and entering the hoof 1.

The upper end of the vertical arm 8 is provided with a horizontal slot 11, adapted to receive the strap 12 of a quarter-boot 13 or any ordinary strap passed around the hoof 1 when the quarter-boot is not used. The strap 12, passing through the slot 11, serves to hold the bracket 6 in place should the screws passing through the openings 10 work out of place.

The sides of the vertical arm 8 of the bracket are provided with ribs 14, forming a guide to which is fitted a corresponding centrally-arranged guideway in the member 6, whereby said member may be applied to or removed from the bracket, as desired. The respective ends of the member 6 are offset, as at 15 and 16, the offset 16 being adapted to receive the arms 7 7, and the offset 15 being adapted to receive the strap 12. Thus it will be seen that when the member 6 is applied to the bracket 5 the wall of the offset 16 will take against the arms 7 7 to limit the downward movement of the member 6 and that the strap 12, passing through the offset 15 and slot 11, will take against the wall of the offset 15 to prevent upward movement of the member 6.

Extending through the member 6 and screwed into the bracket 5 is a screw 17, by means of which the member and bracket are held rigidly together.

Should any or all of the screws employed to hold the parts in place become accidentally dislodged, it will be seen that by the construction hereinbefore described the strap 12 and projection 9 will retain the bracket 5 in place upon the hoof and that the strap 12 and arms 7 7 will retain the member 6 in place upon the bracket. If desired, the screw 17 for securing the member 6 to the bracket 5 and the screws for securing the bracket 5 to the hoof may be entirely dispensed with, in which event the parts will be held in place by the projection 9 and strap 12. Another important feature of my invention is the construction of the detachable member 6, which enables me to increase or decrease the weight, as desired, by removing the member 6 and substituting therefor another larger or smaller one without destroying the means which prevents the loss of the member 6 should the screw 17 become dislodged. This is accomplished by making the distance between the two offset portions 15 and 16 of the member 6 the same in the various-sized members which are intended to be used upon the bracket 5, thereby enabling me to increase or decrease the size of the member 6 both vertically and laterally, and thus retain a construction which will lie flat upon the hoof irrespective of its size.

When a quarter-boot—such, for example, as 13—is used, it is a frequent source of annoyance to have the retaining-strap 12 ride up the hoof 1, and thereby not only loosen the boot, but permit it to work out of place, due to the expansion and contraction of the hoof when the horse is in motion. This disadvantage is entirely obviated by the employment of my invention, which serves to hold the retaining-strap in place.

I claim—

1. A toe-weight comprising a body portion provided with an arm adapted to take against the face of a hoof, said arm being provided with longitudinal guides arranged substantially parallel to the face of the hoof and being provided also with a slot arranged substantially at right angles to said guides and adapted to receive a strap, a detachable member slidingly fitted to said guides and extending to a position adjacent to said strap whereby the strap prevents the movement of said member in one direction, means to prevent the movement of said member in the reverse direction, and means to prevent up-and-down movement of said body portion.

2. A toe-weight comprising a body portion provided with an arm adapted to take against the face of a hoof, said arm being provided with longitudinal guides arranged substantially parallel to the face of the hoof and being provided also with a slot arranged substantially at right angles to said guides and adapted to receive a strap, a detachable member slidingly fitted to said guides and extending to a position adjacent to said strap whereby the strap prevents the movement of said member in one direction, means to prevent the movement of said member in the reverse direction, and a projection on said body portion adapted to be inserted between the hoof and the shoe of a horse.

3. A toe-weight comprising a body portion provided with guides and a slot arranged substantially at right angles to said guides and adapted to receive a strap, a detachable member slidingly fitted to said guides and provided with an offset adapted to receive said strap whereby the strap will prevent movement of said member in one direction, means to prevent movement of said member in the reverse direction, and means to prevent up-and-down movement of said body portion.

4. A toe-weight comprising a body portion provided with guides and a slot arranged substantially at right angles to said guides and adapted to receive a strap, a detachable member slidingly fitted to said guides and provided with an offset adapted to receive said strap whereby the strap will prevent movement of said member in one direction, means to prevent movement of said member in the reverse direction, and a projection on said body portion adapted to be inserted between the hoof and shoe of a horse.

5. A toe-weight comprising a body portion provided with guides and a slot arranged substantially at right angles to said guides and adapted to receive a strap, a detachable member slidingly fitted to said guides and provided with an offset at each end thereof, one of said offsets being adapted to receive said strap whereby the strap will prevent movement of the member in one direction, means adapted to engage the wall of the other offset portion to prevent movement of said member in the reverse direction, and means to prevent up-and-down movement of said body portion.

6. A toe-weight comprising a body portion provided with guides and a slot arranged substantially at right angles to said guides and adapted to receive a strap, a detachable member slidingly fitted to said guides and provided with an offset at each end thereof, one of said offsets being adapted to receive said strap whereby the strap will prevent movement of the member in one direction, means adapted to engage the wall of the other offset portion to prevent movement of said member in the reverse direction, and a projection on said body portion adapted to be inserted between the hoof and shoe of a horse.

In testimony whereof I affix my signature in presence of two witnesses.

OREY D. SHANK.

Witnesses:
 RALPH H. GAMBLE,
 A. V. GROUPE.